(12) United States Patent
Mufti

(10) Patent No.: US 10,057,833 B2
(45) Date of Patent: Aug. 21, 2018

(54) SYSTEM AND METHOD FOR OPTIMIZING A MEDIA GATEWAY SELECTION IN MOBILE SWITCHING CENTER POOL ARCHITECTURE

(71) Applicant: T-Mobile USA, Inc., Bellevue, WA (US)

(72) Inventor: Shujaur Rehman Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/613,960

(22) Filed: Jun. 5, 2017

(65) Prior Publication Data

US 2017/0289895 A1 Oct. 5, 2017

Related U.S. Application Data

(63) Continuation of application No. 15/144,750, filed on May 2, 2016, now Pat. No. 9,674,763, which is a continuation of application No. 13/831,170, filed on Mar. 14, 2013, now Pat. No. 9,344,949.

(51) Int. Cl.

| | |
|---|---|
| *H04L 12/803* | (2013.01) |
| *H04W 40/02* | (2009.01) |
| *H04L 29/08* | (2006.01) |
| *H04L 29/06* | (2006.01) |
| *H04W 48/00* | (2009.01) |
| *H04L 12/733* | (2013.01) |

(52) U.S. Cl.
CPC ........... *H04W 40/02* (2013.01); *H04L 45/126* (2013.01); *H04L 65/103* (2013.01); *H04L 65/1006* (2013.01); *H04L 65/1023* (2013.01); *H04L 65/1043* (2013.01); *H04L 65/1069* (2013.01); *H04L 65/608* (2013.01); *H04L 67/101* (2013.01); *H04L 67/1021* (2013.01); *H04W 48/17* (2013.01)

(58) Field of Classification Search
CPC . H04L 67/1021; H04L 67/101; H04L 47/125; H04W 28/08
See application file for complete search history.

(56) References Cited

U.S. PATENT DOCUMENTS

| | | |
|---|---|---|
| 8,750,884 B1 | 6/2014 | Gorman et al. |
| 9,344,949 B2 | 5/2016 | Mufti |
| 9,674,763 B2 | 6/2017 | Mufti |
| 2002/0057786 A1 | 5/2002 | Donovan et al. |
| 2008/0091827 A1 | 4/2008 | Mo et al. |
| 2009/0122743 A1 | 5/2009 | Ye et al. |
| 2010/0274905 A1 | 10/2010 | Pantaleo et al. |
| 2011/0047282 A1 | 2/2011 | Denman et al. |
| 2011/0051714 A1 | 3/2011 | Somes |
| 2011/0286446 A1 | 11/2011 | Guerra et al. |

*Primary Examiner* — Hoon J Chung
(74) *Attorney, Agent, or Firm* — Perkins Coie LLP

(57) ABSTRACT

A system and method to allow call traffic localization within a mobile switching center server pool (MSS pool) or between MSS pools, provides a trunk group identifier mapped to an originating media gateway. An originating mobile switching center server (MSC server) initiates a call session with a terminating MSC server by sending a session initiation protocol (SIP) message that includes a trunk group identifier mapped to an originating media gateway identity. The terminating MSC server examines the mapping received in the SIP message, and uses the trunk group identifier to select a terminating media gateway for call routing to realize call traffic localization.

20 Claims, 7 Drawing Sheets

SYSTEM AND METHOD FOR OPTIMIZING A MEDIA GATEWAY SELECTION IN MOBILE SWITCHING CENTER POOL ARCHITECTURE

CROSS-REFERENCES TO RELATED APPLICATIONS

This application is a continuation of U.S. patent application Ser. No. 15/144,750, filed on May 2, 2016, now U.S. Pat. No. 9,674,763, and entitled "SYSTEM AND METHOD FOR OPTIMIZING A MEDIA GATEWAY SELECTION IN MOBILE SWITCHING CENTER POOL ARCHITECTURE," which is a continuation application of U.S. patent application Ser. No. 13/831,170, filed on Mar. 14, 2013, now U.S. Pat. No. 9,344,949, and entitled "SYSTEM AND METHOD FOR OPTIMIZING A MEDIA GATEWAY SELECTION IN MOBILE SWITCHING CENTER POOL ARCHITECTURE," each of which is incorporated herein in its entirety by reference.

BACKGROUND

Radio communication systems, such as the Global System for Mobile Communication (GSM) or the Universal Mobile Telecommunications System (UMTS), generally includes a core network (CN) and a radio access network (RAN). The core network provides services, such as routing phone calls, to user equipment (UE) connected by the radio access network (RAN). The core network includes inter-connected nodes known as Mobile Switching Center (MSC) servers (MSS or MSC server). The radio access network includes base station controllers/radio network controllers (BSCs/RNCs).

The core network architecture is divided into a call control layer and a connectivity layer. An MSC server is implemented in the control layer, and is responsible for signaling traffic (e.g., call set up, charging, etc.) and controlling Media Gateways (MGWs). Media gateways are implemented in the connectivity layer where all user data is transported, routed and switched, and are responsible for handling the bearer traffic according to instructions from an MSC server. An MSC server is usually located at a central site for signaling and managing Media gateways, while Media gateways are usually deployed at remote sites and at interconnection points with other mobile and fixed networks.

Several MSC servers can be connected together to form a MSC server pool (or MSS pool), whereby all MSC servers within the pool operate together to handle the traffic load in the network. In the MSS pool architecture, each MSC server in the pool is connected to all base station controller/radio network controllers, such that each MSC server node shares the same service area as the other MSC server nodes in the same pool. The MSS pool architecture, also known as Iu-flex (Wideband Code Division Multiple Access (WCDMA)) or A-Flex (GSM), conforms to the 3GPP TS 23.236 specification for Intra Domain Connection of RAN Nodes to Multiple CN Nodes. Media gateways support MSS pooling through a feature known as the Virtual Media Gateway (vMGW) that allows all MSC servers in the pool to use the resources in one physical MGW.

DETAILED DESCRIPTION

A system and method for optimizing media gateway selection for efficient call routing in an MSS pool is described in detail below. An MSS pool includes multiple media gateways (MGWs) that are controlled by all of the MSC servers in the pool. A terminating side MSC server in the MSS pool generally randomly allocates a media gateway for a mobile to mobile call, or a mobile to PSTN call, between MSC servers upon receiving a message regarding the call from an originating MSC server. As a result of random allocation of the terminating media gateway, the call is likely to traverse through one or more intermediate media gateways, even when the called party is connected to the same media gateway as the calling party.

By selecting a media gateway that is geographically close (e.g., in inter-pool call routing) or even the same as the call's originating point (e.g., in intra-pool call routing), the present system of optimizing media gateway selection described below reduces the number of media gateway nodes that a given call has to traverse before reaching its terminating point. Furthermore, optimizing the terminating MGW selection provides the shortest path possible for the payload or bearer traffic to travel through the network, which allows the call traffic to be localized. Localization of the call traffic can significantly improve network efficiency. In implementations where the MSS pool is large with many MSC servers and media gateways, optimizing the terminating media gateway selection becomes more critical.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
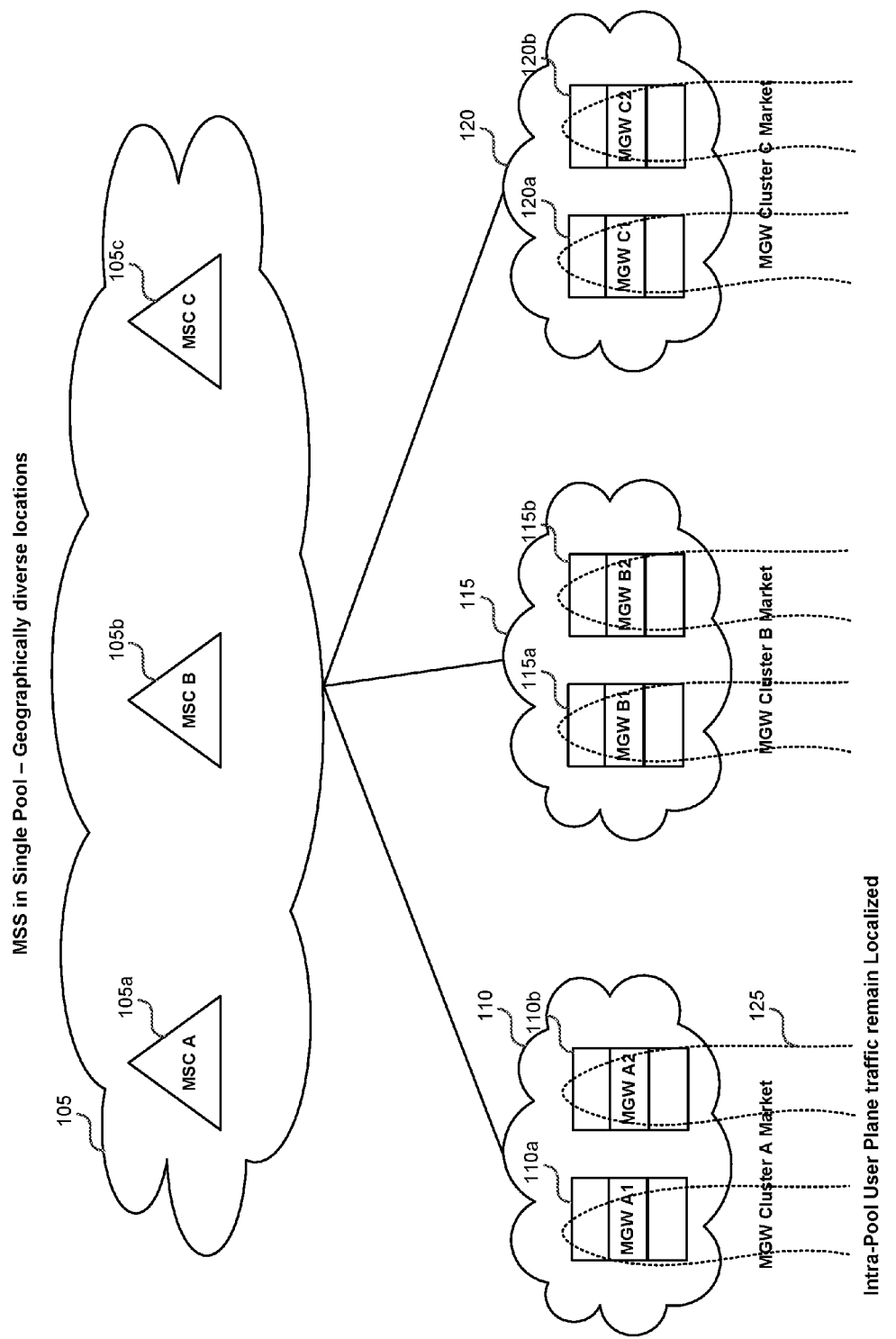
FIG. 1 is a diagram illustrating intra-pool user plane traffic localization in a MSS pool architecture.

Referring to FIG. 1, an MSS pool 105 configured for intra-pool user plane traffic localization is depicted. The MSS pool 105 includes MSC servers A, B and C (105a, 105b and 105c respectively) that together serve geographically diverse locations as one large combined area. Within this pooled area, a user equipment (UE) can freely roam without having to change the MSC node serving the UE. Although three MSC servers are illustrated, it should be understood that a single MSS pool can include more or less number of MSC servers.

Connected to the MSS pool 105 are media gateway clusters 110, 115 and 120 that provide interface for, and support and connect to CS networks such as the PSTN network, and radio access networks, including 2G, 3G and other external networks. Each media gateway cluster services a geographical region. For example, media gateway clusters 110, 115 and 120 service markets A, B and C, respectively, which may be geographically diverse. Within each media gateway cluster are multiple media gateways. For example, media gateway cluster 110 includes MGW A1 (110a) and MGW A2 (110b). Although two media gateways are shown in each media gateway cluster, it should be understood that more or less number of media gateways may be present in some implementations. For example, in a city with a large number of subscribers, the number of media gateways in a media gateway cluster can be more than two.

A call that originates from MGW A1 can be routed through any of the media gateways, including MGW A1, A2, B1, B2, C1 or C2 that are all under the control of the MSS pool 105. However, when the call is routed via MGW A1, the call is localized to the originating MGW cluster 110, and the originating MGW A1, as shown by the traffic path 125. By localizing the call traffic that originates from a media gateway to the same media gateway, the path that the call payload needs to travel is minimized, thereby optimizing the use of network resources.

Figure 2:
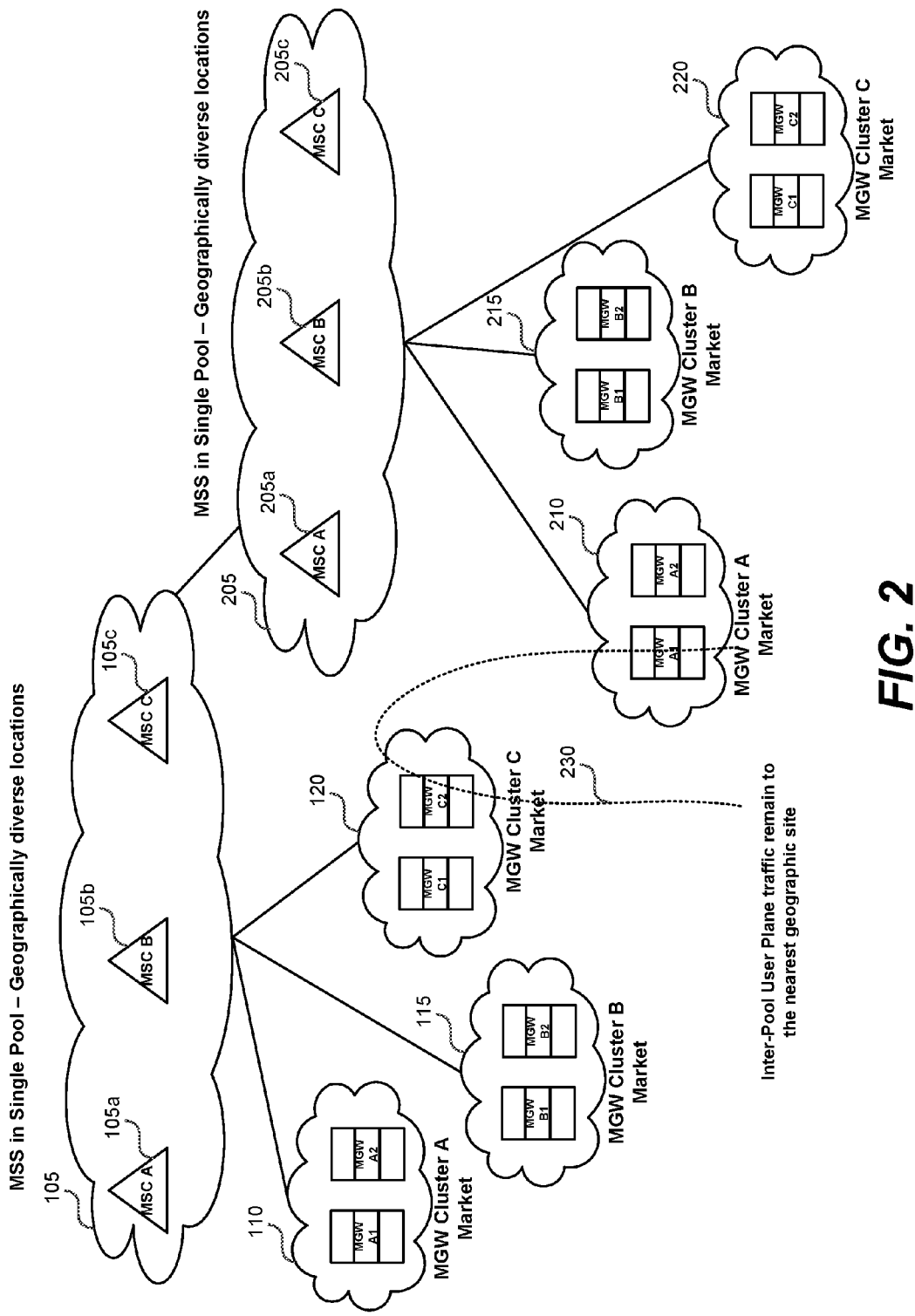
FIG. 2 is a diagram illustrating inter-pool user plane traffic routing in a MSS pool architecture.

Optimization of a media gateway selection in an inter-pool configuration in shown in FIG. 2. The core network includes at least two MSS pools 105 and 205. The MSS pool 105, as in FIG. 1, controls media gateway clusters A, B and C. The MSS pool 205 services a second combined area including geographically diverse locations, and includes multiple MSC servers A, B and C (205a, 205b and 205c respectively). The MSS pool 205 controls media gateway clusters 210, 215 and 220 serving markets A, B and C respectively.

If a calling party is handled by the MSS pool 105, and the calling party is handled by the MSS pool 205, the inter-pool user plane traffic is localized by routing the call that originates from MGW C2 in MGW cluster 120 in MSS pool 105 via a media gateway in MSS pool 205 that is geographically nearest to the originating MGW. If the geographically nearest media gateway for terminating the call is MGW A1 in cluster 210, then that media gateway is selected for routing the call, thereby keeping the distance that the payload has to travel the shortest (i.e., shortest path 230).

Figure 3:
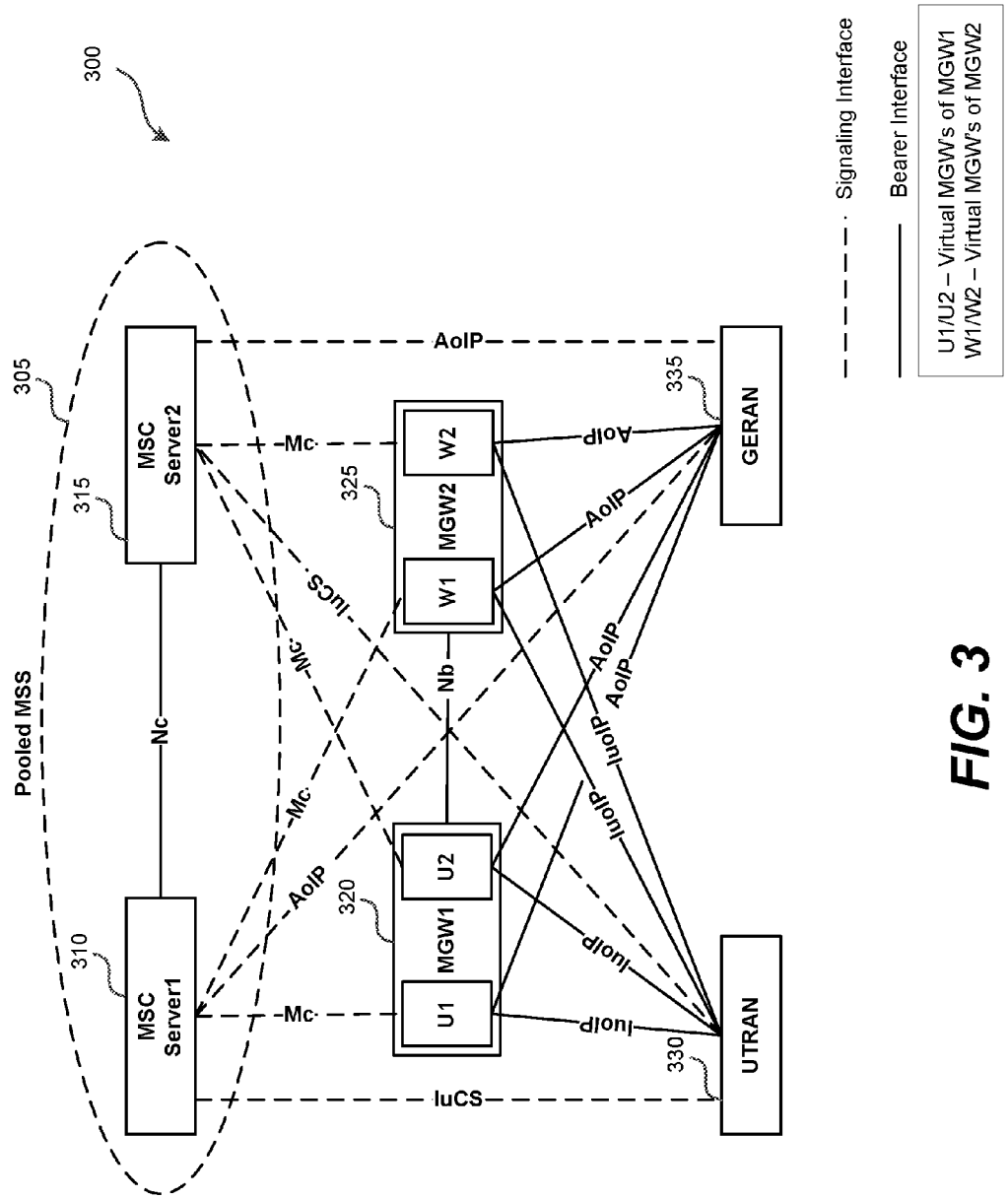
FIG. 3 is a block diagram illustrating various signaling and bearer interfaces between MSC server nodes, media gateway nodes and radio access network nodes in a fully deployed MSS pool architecture.

Various interfaces between MSC server nodes, media gateway nodes and radio access network nodes in a fully deployed MSS pool architecture 300 is illustrated in FIG. 3. The MSS pool 305 includes at least two MSC servers 310 and 315 in the control layer. Each of the MSC servers is configured as a Media Gateway Control Function (MGCF). The MGCF provides interface and support for the Internet Protocol Media Subsystem (IMS), which is an architectural framework for delivering Internet Protocol (IP) multimedia to mobile users over various types of wired and wireless networks, and the Public Switched Telephone Network (PSTN).

The MSC server supports various interfaces to connect to the core network elements and the radio access network elements. For example, the MSC server provides an Nc interface to connect with its peers in the MSS pool 305 and an Mc interface to connect with the media gateways 320 and 325. The MSC server further provides an IuCS interface to connect with the Universal Terrestrial Radio Access Network (UTRAN) 330 that refers to node B's and radio network controllers in the UMTS radio access network (3G network). The MSC server also supports Audio over IP (AoIP) interface to connect with GSM EDGE Radio Access Network (GERAN) 335. The Mc interface between the MSC servers and the media gateways, and the IuCS/AoIP interfaces between the MSC servers and the UTRAN/GERAN are signaling interfaces used by the MSC server to communicate signals or instructions to the MGWs and the UTRAN/GERAN nodes respectively.

The connectivity layer includes at least two media gateways 320 and 325, both of which are under the control of MSC servers 310 and 315. The media gateways 320 and 325 are CS/IMS media gateways that provide an interface for, and support and connect to, Circuit Switched (CS) networks. The media gateways include at least two virtual media gateways (vMGWs). For example, MGW1 includes virtual media gateways U1 and U2, while MGW2 includes virtual media gateways W1 and W2. The media gateways connect over Nb interface with their peers. The virtual media gateways connect over Iu over IP (IuoIP) interface with UTRAN 330 and over AoIP interface with GERAN 335. The Nb interface, and the AoIP/IuoIP interface between the MGW and the UTRAN/GERAN are bearer interfaces that carry the call (user plane) data or payload.

Figure 4:
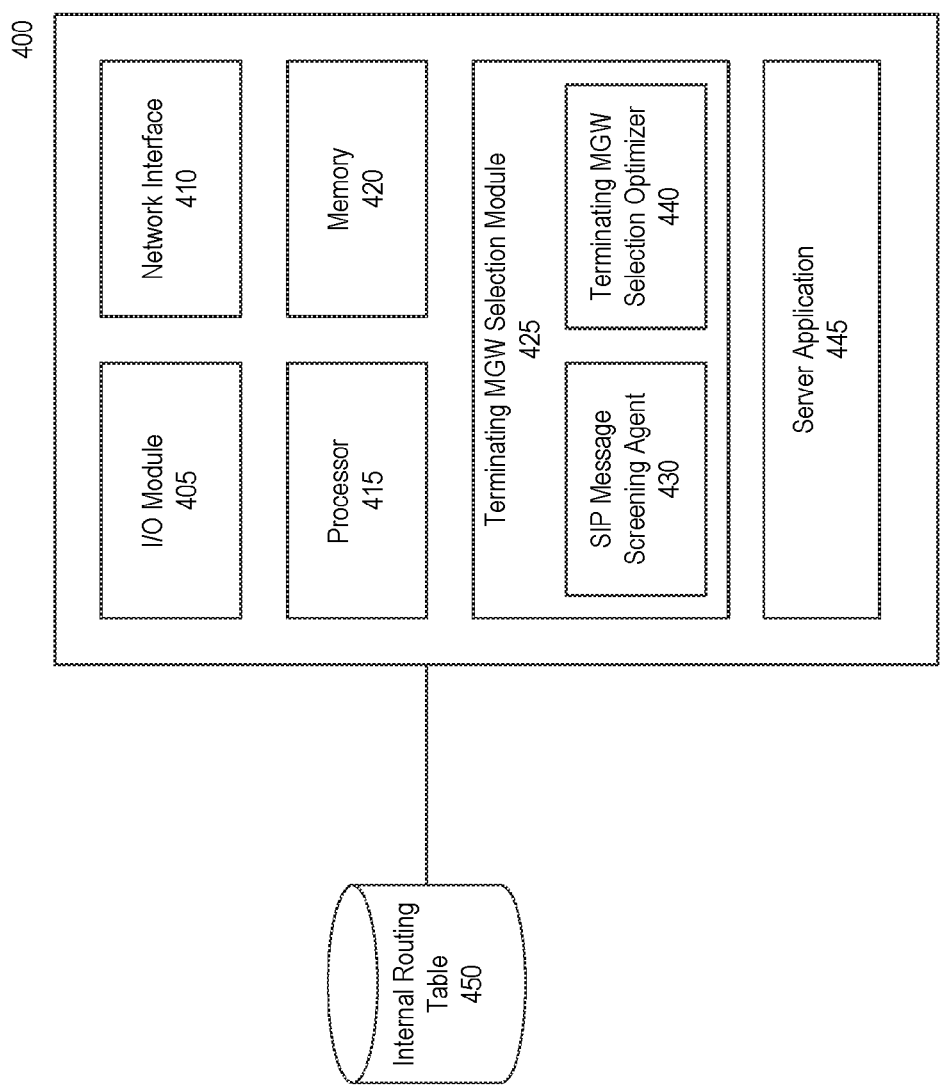
FIG. 4 is a block diagram of example components of an MSC server implementing the method of optimizing a media gateway selection in the fully deployed MSS pool architecture.

FIG. 4 is a block diagram of example components of an MSC server 400 (e.g., MSC server 105a-c or MSC server 205a-c) implementing the method of optimizing a media gateway selection in the fully deployed MSS pool architecture. The MSC server 400 may include various components for facilitating optimized MGW selection in the MSS pool for efficient call routing. For example, in one embodiment, the MSC server 400 includes an input/output (I/O) module 405 for data transfer, a network interface 410 for facilitating the data transfer, a processor module 415 for processing stored instructions, a memory 420 for storing instructions, and other reusable data, a terminating media gateway selection module 425 for optimizing media gateway selection, and a server application 445. The MSC server 400 may also have access to an internal routing table 450 that includes routing information that can be used by the terminating media gateway selection module 425 for selecting an optimal media gateway for routing a call.

The MSC server 400, via the I/O module 405, sends messages to and receives messages from media gateways and other MSC servers. In some implementations, the I/O module 405 may facilitate transfer of billing data, interface with other network components, and the like. The network interface 410 of the MSC server 400 provides an interface for signaling traffic over various protocols such as the internet protocol (IP), the session initiation protocol (SIP), and the like. The memory 420 includes RAM, EPROM, EEPROM, or storage device such as any kind of optical or magnetic storage medium for storing instructions that can be processed by the processor module 415. The processor module 415 may include one or more processors that process instructions stored in the memory 420, execute the MSC server application 445, process instructions embodied in other components such as the terminating media gateway selection module 425, and the like. The server application 445 may include program instructions for controlling calls and media gateway nodes.

The terminating media gateway selection module 425, in one implementation, facilitates optimized media gateway selection using a SIP message screening agent 430, a terminating media gateway selection optimizer 440 and information from the internal routing table 450. The SIP message screening agent 430 creates and/or evaluates a SIP message that includes information such as a trunk group identifier for optimizing selection of a terminating media gateway.

The trunk group identifier is a voice over IP trunk group parameter generally used in the context of VoIP applications and is described in RFC 4904. In the MSS pool architecture, the trunk group identifier is mapped to the originating media gateway, and is used for selecting a terminating media gateway by the terminating MSC server for routing the call to the called party. Alternately, the MSC server in the MSS pool has access to one or more internal routes mapped to the trunk group identifier. The trunk group identifier has a format that can be customized as desired. For example, in one implementation, the trunk group identifier can have the format of "1-345" where "1" is the MGW identity or identifier and "345" is the tgrp identifier mapped to the originating MGW identity. In some implementations, another parameter called a trunk context may be included in the SIP message. The trunk context parameter may include additional information such as the domain/sub-domain name of the MSC server, and the like.

In one implementation, when the screening agent 430 detects the trunk group identifier in a SIP message, the terminating MGW selection optimizer 440 selects the media gateway that is mapped to the trunk group identifier received. For example, when the originating media gateway trunk group identifier "1-345" is included in the SIP message, the optimizer 440 selects a media gateway having an identifier (e.g., 345) that maps to the trunk group identifier as the terminating media gateway for routing the call. In this example, the optimizer 440 selects the originating media gateway as the terminating media gateway based on the trunk group identifier in received in the SIP message. In another implementation, in the inter-pool configuration, the optimizer 440 may use the trunk group identifier to select a terminating media gateway that is geographically nearest to the originating media gateway in order to minimize the distance the call payload would need to travel.

In another implementation, the optimizer 440 may use the routing information in the internal routing table 450 to select a call route that is mapped to the trunk group identifier. For example, the call route table may specify, for a given trunk group identifier (e.g., "1-345"), the media gateway (e.g., MGW5) to be selected for call routing. In one implementation, the call route table 450 may include information such as the IP address of media gateways, port numbers, and the like that can be used to add a termination to the call.

Figure 5:
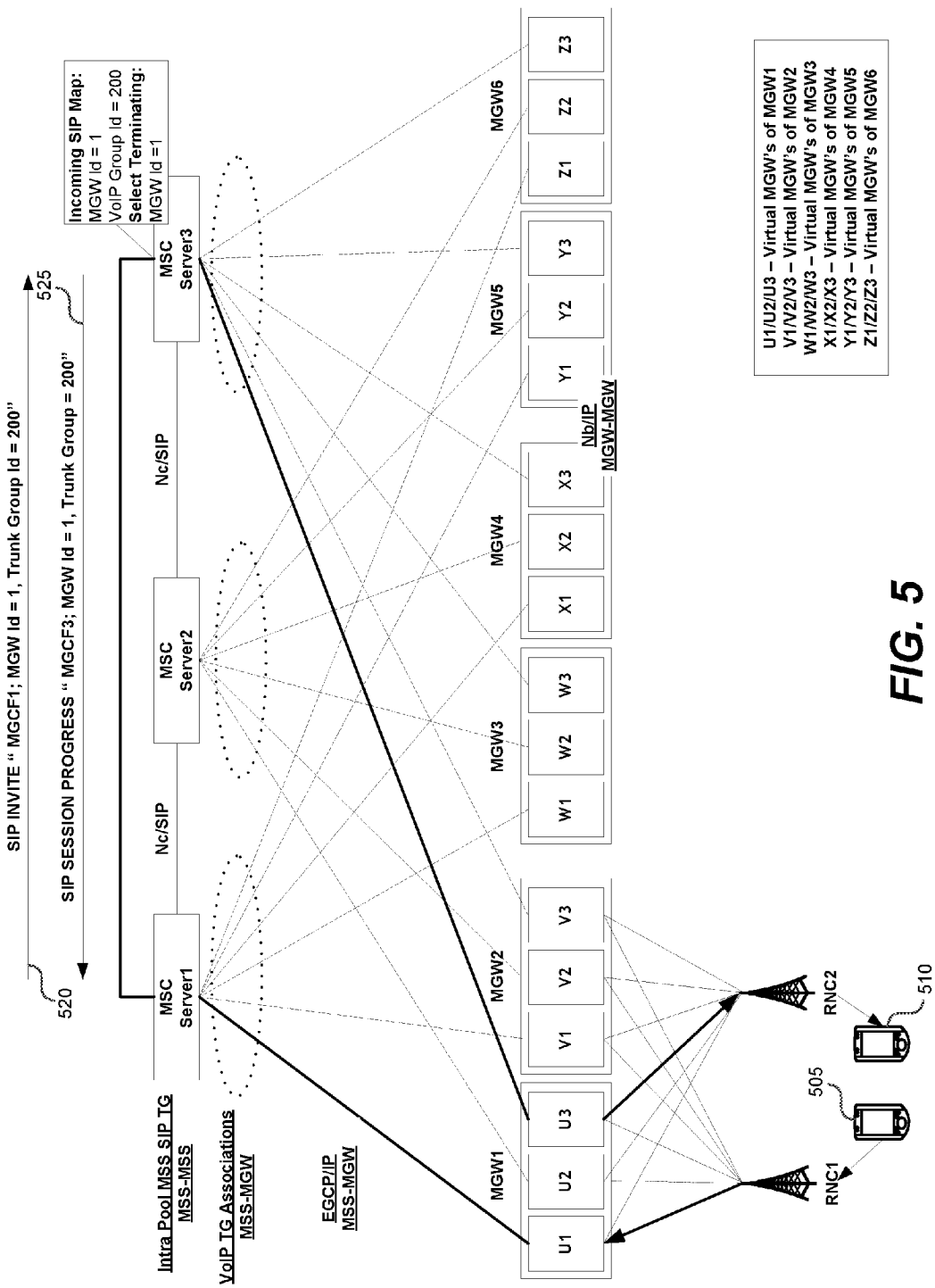
FIG. 5 is a diagram illustrating a first example of a terminating media gateway selection based on the originating media gateway in a fully deployed MSS pool architecture.

A first example of a terminating media gateway selection based on the originating media gateway identity in a fully deployed MSS pool architecture is depicted in FIG. 5.

The MSS pool includes MSC server 1, MSC server 2 and MSC server 3 configured as MGCFs. The inter-machine trunk (IMT) is based on Nc interface and is SIP capable. The MSC servers in the MSS pool handle the network traffic by signaling media gateways MGW 1-6. The MSC-MGW interface is based on the Extensible Gateway Control Protocol (EGCP) over IP. The inter-service trunk (IST) interface between the media gateways is based on Nb interface over IP. The radio access network nodes (e.g., RNC1 and RNC2) are connected to the media gateways via virtual media gateways. For example, virtual media gateway U1 is controlled by MSC1, U2 is controlled by MSC2 and U3 is controlled by MSC3 to allow connectivity between subscriber equipment 505 (e.g., calling party) and 510 (e.g., called party), and the core network.

Each subscriber equipment is served by one dedicated MSC server node in the MSS pool as long as the subscriber equipment is within the radio coverage area of the MSS pool. In FIG. 5, the calling party 505 is served by the MSC server 1, while the called party 510 is served by the MSC server 3, in the same MSS pool. To initiate a call, the MSC server 1 seizes the resources of, for example, MGW1 to add a terminal (i.e., the calling party 505). The MSC server 1, using SIP, sends a SIP INVITE message 520 to the MSC server 3 to route the call to the called party 510.

The SIP INVITE message 520 is formulated by the MSC server 1, using information relating to the calling and the called parties. For example, MSC server 1 is aware that MGW1 is the originating media gateway, and that the called party 510 is handled by the MSC server 3. The SIP INVITE message 520 includes the originating media gateway identifier or identity and an additional piece of information in the form of a trunk group identifier to allow MSC server 3 is to optimize the selection of a terminating media gateway for routing the call to the called party 510.

In one implementation, for example, the MSC server 1 sends a SIP INVITE message 520, substantially in the form of:
SIP INVITE "MGCF1; MGW Id=1, Trunk Group Id=200"

The MSC server 3, receiving the SIP INVITE message 520, parses the message and extracts the originating MGW identifier of "1", and the trunk group identifier of "200." The MSC server 3, using the mapping between the trunk group identifier-MGW identifier, determines that MGW1 should be selected as the terminating media gateway.

The MSC server 3 sends a response message 525 back to the MSC server 1, substantially in the form of:
SIP SESSION PROGRESS "MGCF3; MGW Id=1, Trunk Group Id=200"

The MSC server 3 then signals to the terminating media gateway (i.e., MGW1) to route the call to subscriber 510. The call is then routed to the subscriber 510 via the terminating media gateway having the same identifier or identity as the originating media gateway, but via a different virtual media gateway (U3).

Figure 6:
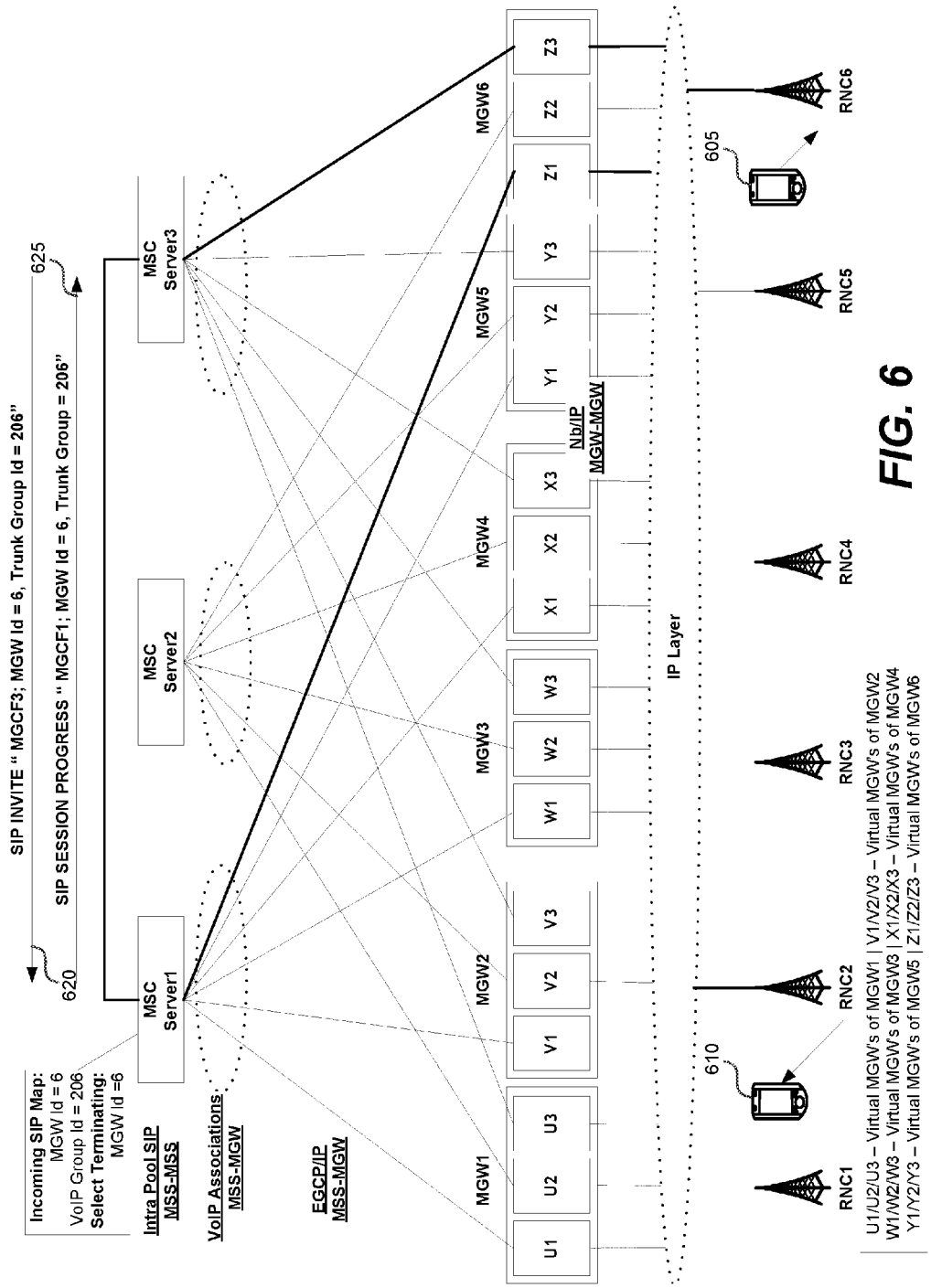
FIG. 6 is a diagram illustrating a second example of a terminating media gateway selection based on the originating media gateway in a fully deployed MSS pool architecture.

A second example of a terminating media gateway selection based on the originating media gateway in a fully deployed MSS pool architecture is depicted in FIG. 6. In this example, the calling party 605 is serviced by MSC server 3, while the called party 610 is serviced by MSC server 1 of the same MSS pool. The MSC server 3 adds a termination to the call via MGW 6. The MSC server 3 then formulates a SIP INVITE message 620, including the originating media gateway identifier of "6" and the assigned trunk group identifier of "206," to the MSC server 1. The MSC server 1 acknowledges the message via a SIP SESSION PROGRESS message 625. The MSC sever 1, using the MGW-trunk group identifier mapping, selects a media gateway having an assigned trunk group identifier of "206" as the terminating media gateway, which corresponds to MGW 6. The call is routed via MGW 6, thereby localizing the call traffic.

Figure 7:
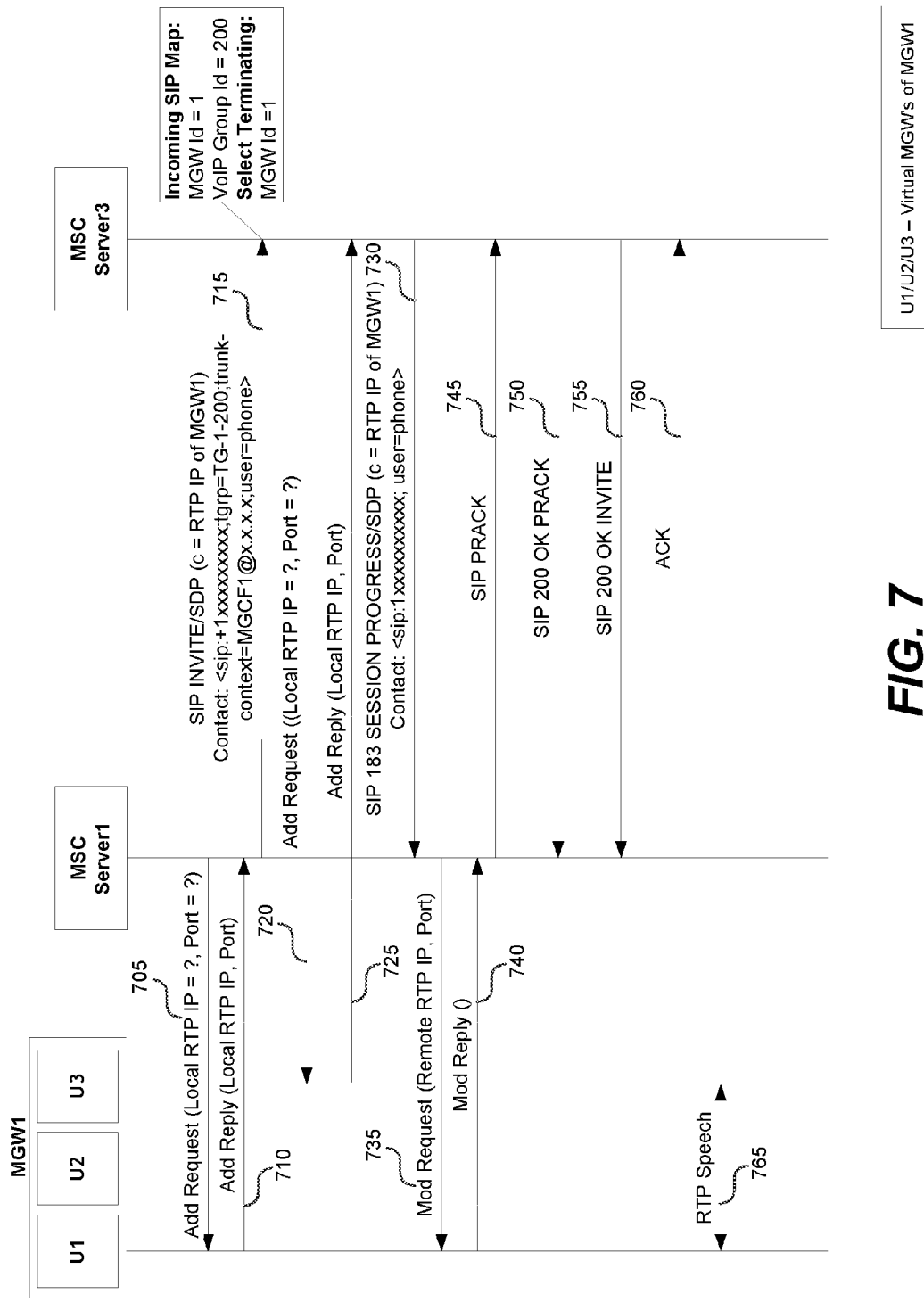
FIG. 7 is a signaling diagram corresponding to the first example of a terminating media gateway selection based on the originating media gateway in the fully deployed MSS pool architecture illustrated in FIG. 5.

A signaling diagram corresponding to the first example of a terminating media gateway selection based on the originating media gateway in the fully deployed MSS pool architecture illustrated in FIG. 5 is depicted in FIG. 7. An originating MSC server 1, which serves a calling party, is connected to an originating MGW 1. The terminating MSC server 3, which serves a called party, is to be connected to a terminating media gateway. The originating MGW 1 includes virtual media gateways U1, U2 and U3. The MSC server 1 has seized the resources of the virtual media gateway U1. The remaining virtual media gateways U2 and U3, as well as other media gateways in the MSS pool (e.g., MGW2-6 not shown) are available for signaling.

When a call signal is received from the originating MGW 1, the originating MSC server 1 sends an add request 705 to the originating MGW 1 to create a context and add a first termination to the context. The context can be a regular phone call with two terminations, or a conference call with more than two terminations. The add request may also specify media type such as the Real-time Transfer Protocol (RTP), IP address of the MGW1, port number of the MGW1, and the like. The originating MGW1 adds a termination as requested and sends an add reply response 710 back to the originating MSC server 1. The add request and add reply commands are defined by the EGCP standard.

The originating MSC server 1 then sends a SIP INVITE message 715 that includes a trunk group identifier in a trunk group field "tgrp" in the message contact header to the terminating MSC server 3 connected to the called party. In some implementations, the SIP INVITE message may also include a trunk context. SIP uses session description protocol (SDP) to exchange additional information about the call. For example, using the "c" field of SDP, the MSC server 1 provides MSC server 3 information regarding the IP address of the MGW 1, media type expected, and the like.

The terminating MSC server 3 receives the SIP INVITE message and examines the SIP map. The MSC server 3 selects MGW 1 as the terminating media gateway based on the incoming SIP map, where MGW identifier is 1, and the VoIP trunk group identifier is 200. The MSC server 3 sends an add request 720 to MGW 1 to add a second termination to the context. The terminating MGW 1, specifically vMGW U3, in turn, adds the second termination and sends an add reply message 725 back to the terminating MSC server 3.

Once the terminations are added to the context, the terminating MSC server 3 sends a status code "183" indicating session progress in a SIP/SDP message 730 to the MSC server 1 to advise the originating MSC server 1 that the session is in progress. The session description may be used by the originating MSC server 1 to send a mod request 735 to the originating MGW 1 to, for example, apply ringback tone to the first termination. The originating MGW 1, after receiving the mod request message, applies the ringback tone and generates a mod reply message 740 for the originating MSC server 1.

Following the mod request/reply message exchange, the originating MSC server 1 generates a SIP PRACK message 745 for the terminating MSC server 3 to provisionally acknowledge the session description. When the called party picks up the call, the terminating MSC server 3 sends a 200 OK PRACK message 750 followed by a 200 OK INVITE message 655 to indicate that the initial invitation from the originating MSC server 1 has been accepted. Upon receiving the INVITE message acknowledgement from the terminating MSC server 3, the call session is established. Once the call session is established, the originating MSC server 1 sends a final ACK message 660 to acknowledge the call session to the terminating MSC server 3. At 665, the voice data for the established call is exchanged between the calling and the called parties over RTP. RTP is a protocol for delivering audio/video over the mobile network.

CONCLUSION

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device such as a single server, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM or flash semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given sequence, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

I claim:

1. At least one tangible computer-readable medium carrying instructions that when executed by at least one data processing device, selects a media gateway for a call in a mobile switching center (MSC) pool including at least a first MSC server and a second MSC server, comprising:
   adding, by the first MSC server, a first call identifier on a media gateway,
      wherein the media gateway is one of the multiple media gateways under the control of the first MSC server;
   receiving, by the first MSC server, a response to the adding of the first call identifier on the media gateway;
   initiating a session initiation protocol (SIP) session with the second MSC server by sending a SIP message,
      wherein the SIP message includes
         an identifier mapped to the media gateway and
         a trunk context that includes a domain name or a sub-domain name associated with the MSC pool,
      wherein the second MSC server selects the media gateway mapped to the identifier and/or the trunk context to add a second call identifier, such that the first call identifier and the second call identifier are serviced by the same media gateway.

2. The at least one tangible computer-readable medium of claim 1, wherein the first call identifier is a calling termination, wherein the second call identifier is a called termination, wherein each media gateway is divided into multiple virtual media gateways, such that the calling termination is serviced by a first virtual media gateway of the media gateway, and the called termination is serviced by a second virtual media gateway of the same media gateway.

3. The at least one tangible computer-readable medium of claim 2, wherein when a call is established between a calling termination and a called termination, speech data is exchanged between the calling termination and the called termination over real-time transport protocol (RTP).

4. The at least one tangible computer-readable medium of claim 2, wherein the first call identifier is a calling termination, wherein the identifier is a trunk group identifier, wherein the second call identifier is a called termination, and further comprising initiating, by the first MSC server or the second MSC server, a SIP session with a third MSC server by sending a SIP message including the trunk group identifier that is mapped to the media gateway to add a second called termination and allow exchange of speech data, over real-time transport protocol (RTP), among the first calling party, the called party and the second called party.

5. The at least one tangible computer-readable medium of claim 4, wherein the second called termination is serviced by a third virtual media gateway of the media gateway.

6. The at least one tangible computer-readable medium of claim 4, wherein when the third MSC server is not in the same MSC pool as the first MSC server and the second MSC server, the third MSC server selects a media gateway that is geographically nearer to the media gateway mapped to the trunk group identifier to add the second called termination.

7. The at least one tangible computer-readable medium of claim 4, wherein the called termination is a user equipment connected to at least one of a radio access network or a public switched telephone network.

8. A method for selecting a media gateway for a call in a mobile switching center (MSC) pool including at least a first MSC server and a second MSC server, the method comprising:
   adding, by the first MSC server, a first call identifier on a media gateway,
      wherein the gateway is one of the multiple media gateways under the control of the first MSC server;

receiving, by the first MSC server, a response to the adding of the first call identifier on the media gateway;

initiating a session initiation protocol (SIP) session with the second MSC server by sending a SIP message,
wherein the SIP message includes an identifier that is mapped to the media gateway and a trunk context that includes a domain name or a sub-domain name associated with the MSC pool,
wherein the second MSC server selects the media gateway mapped to the identifier and/or the trunk context to add a second call identifier, such that the first call identifier and the second call identifier are serviced by the same media gateway.

9. The method of claim 8, wherein the first call identifier is a calling termination, wherein the identifier is a trunk group identifier, wherein the second call identifier is a called termination, wherein each media gateway is divided into multiple virtual media gateways, such that the calling termination is serviced by a first virtual media gateway of the media gateway, and the called termination is serviced by a second virtual media gateway of the same media gateway.

10. The method of claim 9, wherein when a call is established between a calling termination and a called termination, speech data is exchanged between the calling termination and the called termination over real-time transport protocol (RTP).

11. The method of claim 9, wherein the first call identifier is a calling termination, wherein the identifier is a trunk group identifier, wherein the second call identifier is a called termination, and further comprising initiating, by the first MSC server or the second MSC server, a SIP session with a third MSC server by sending a SIP message including the trunk group identifier that is mapped to the media gateway to add a second called termination and allow exchange of speech data, over real-time transport protocol (RTP), among the first calling party, the called party and the second called party.

12. The method of claim 11, wherein the second called termination is serviced by a third virtual media gateway of the media gateway.

13. The method of claim 11, wherein when the third MSC server is not in the same MSC pool as the first MSC server and the second MSC server, the third MSC server selects a media gateway that is geographically nearer to the media gateway mapped to the trunk group identifier to add the second called termination.

14. The method of claim 11, wherein the called termination is a user equipment connected to at least one of a radio access network or a public switched telephone network.

15. A system for selecting a media gateway for a call in a mobile switching center (MSC) pool, comprising:

a first MSC server having at least one processor, wherein the first MSC server is configured to:
add a first call identifier on a media gateway that is one of the multiple media gateways under the control of the first MSC server;
receive a response to the adding of the first call identifier on the media gateway; and
initiate a session initiation protocol (SIP) session with the second MSC server by sending a SIP message,
wherein the SIP message includes an identifier that is mapped to the media gateway and a trunk context that includes a domain name or a sub-domain name that is associated with the MSC pool; and
a second MSC server having at least one processor, wherein the second MSC server is configured to select the media gateway mapped to the identifier and/or the trunk context to add a second call identifier, such that the first call identifier and the second call identifier are serviced by the same media gateway.

16. The system of claim 15, wherein the first call identifier is a calling termination, wherein the second call identifier is a called termination, wherein each media gateway is divided into multiple virtual media gateways, such that the calling termination is serviced by a first virtual media gateway of the media gateway, and the called termination is serviced by a second virtual media gateway of the same media gateway.

17. The system of claim 16, wherein when a call is established between a calling termination and a called termination, speech data is exchanged between the calling termination and the called termination over real-time transport protocol (RTP).

18. The system of claim 16, wherein the first call identifier is a calling termination, wherein the identifier is a trunk group identifier, wherein the second call identifier is a called termination, and further comprising initiating, by the first MSC server or the second MSC server, a SIP session with a third MSC server by sending a SIP message including the trunk group identifier that is mapped to the media gateway to add a second called termination and allow exchange of speech data, over real-time transport protocol (RTP), among the first calling party, the called party and the second called party.

19. The system of claim 18, wherein when the third MSC server is not in the same MSC pool as the first MSC server and the second MSC server, the third MSC server selects a media gateway that is geographically nearer to the media gateway mapped to the trunk group identifier to add the second called termination.

20. The system of claim 18, wherein the called termination is a user equipment connected to at least one of a radio access network or a public switched telephone network.

* * * * *